(No Model.)
W. B. INGERSOLL.
HORSE POWER.
No. 279,764. Patented June 19, 1883.
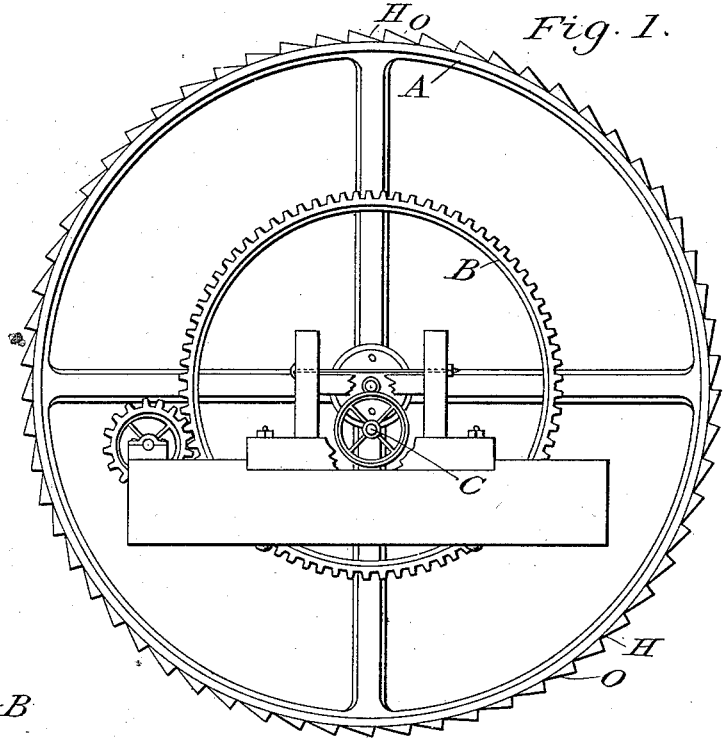
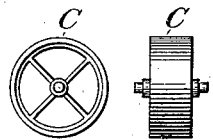
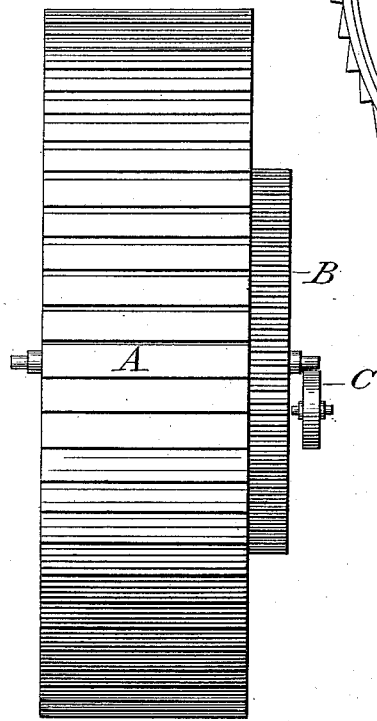
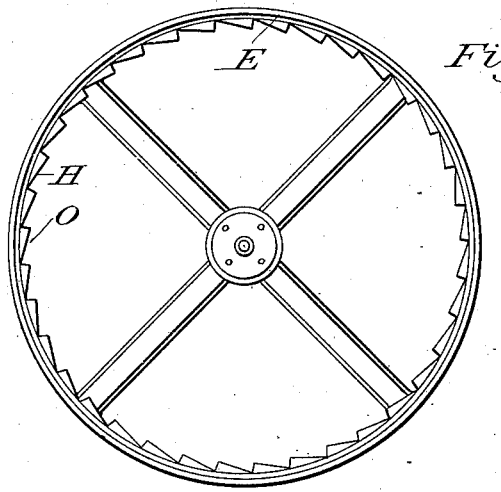
Witnesses:
William J. Fry
W. H. Dymond
Inventor:
William B. Ingersoll

UNITED STATES PATENT OFFICE.

WILLIAM B. INGERSOLL, OF CHICAGO, ILLINOIS.

HORSE-POWER.

SPECIFICATION forming part of Letters Patent No. 279,764, dated June 19, 1883.

Application filed September 16, 1882. (No model.)

*To all whom it may concern:*

Be it known that I, WILLIAM B. INGERSOLL, a citizen of the United States, residing at Chicago, county of Cook, and State of Illinois, have invented a new and useful Improvement in Horse-Powers or Tread-Powers, of which the following is a specification.

The improvement in my invention consists of a large wheel, A, which should be made of such a width and diameter, and of suitable size for the horse, horses, or other animals to walk on the top of it, or a little to one side from the top center, just as the power and kind of work may require. The periphery of this wheel is made in a peculiar form, as follows: with treads raised at the heel of them above the general surface of the wheel. The object of raising the outer or heel portion of the tread is to give to a horse or other animal a flat, even, and more level surface for the feet, thereby making it much more easy for the animal to travel on it.

Figure 1 represents the large tread and power wheel with its treads on the periphery. Fig. 2 represents a face view of the same wheel, showing ends of shaft and journals. Fig. 3 shows the friction-wheel upon which the journals rest and bear. Fig. 4 represents the treads as placed on the inside of the rim of a tread and power wheel.

H and O show the treads and the form of the periphery of the wheel A; also the same form of tread to be used on the inner portion of the rim of the wheel E, (see H O.) The same advantage is gained to the animal on the inside of a wheel with treads so arranged, the treads being about eight inches wide, and raised at the heel about two or two and one-half inches above the toe or the general surface of the rim of the wheel.

B is a smaller wheel, with cogs which mesh into a still smaller wheel or pinion with cogs. By the use of such a wheel as above described, (see letter A,) having a diameter of about fourteen feet, I gain a very great leverage-purchase, and with treads so arranged it is easy for horses or other animals to walk on the periphery of the wheel, and being mounted upon the top of a friction-wheel (not anti-friction) almost all of the friction is transferred from the large wheel A to the small friction-wheel C, which is a wheel twelve inches in diameter having an eight-inch face. It has its shaft, journals, and boxes. The large driving-wheel may be made of any desirable width or diameter, just sufficient for one horse, or it may be made wide enough for ten, twenty, or more, just as is required.

What I claim as my invention, and desire to secure by Letters Patent, is—

1. The large wheel or driving-wheel A, that is made of sufficient size in diameter and width so that one or more horses or other animals can walk on the top of it, to be used for driving machinery of any kind.

2. The improved heel-elevated tread H O on the periphery of the wheel, or on the inside of a wheel, where it is sometimes desirable to place the animal to do the work.

WILLIAM B. INGERSOLL.

Witnesses:
   D. H. FLETCHER,
   BENJ. FRANKLIN.